United States Patent
Gadre et al.

(10) Patent No.: US 7,606,391 B2
(45) Date of Patent: Oct. 20, 2009

(54) VIDEO CONTENT SCENE CHANGE DETERMINATION

(75) Inventors: Shirish Gadre, Fremont, CA (US); Pattabiraman Subramanian, Santa Clara, CA (US); Chungkuang P. Chu, San Jose, CA (US); Ikuo Tsukagoshi, Tokyo (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1100 days.

(21) Appl. No.: 10/864,915

(22) Filed: Jun. 8, 2004

(65) Prior Publication Data

US 2005/0025361 A1  Feb. 3, 2005

Related U.S. Application Data

(60) Provisional application No. 60/490,288, filed on Jul. 25, 2003.

(51) Int. Cl.
G06K 9/00 (2006.01)
H04N 9/64 (2006.01)

(52) U.S. Cl. .................. 382/103; 382/236; 348/699

(58) Field of Classification Search .......... 382/103, 382/107, 154, 156, 162, 172, 181, 194, 209, 382/254, 242, 250, 276, 287, 288–291, 305, 382/284; 375/240.12, 240.16, 240.28; 250/214; 348/699
See application file for complete search history.

(56) References Cited

U.S. PATENT DOCUMENTS 5,949,064 A * 9/1999 Chow et al. ............ 250/214 LS
6,069,365 A   5/2000 Chow et al.

(Continued)

FOREIGN PATENT DOCUMENTS

EP   1 043 664 A   11/2000

(Continued)

OTHER PUBLICATIONS

Lefevre, S. et al., "A review of real-time segmentation of uncompressed video sequences fro content-based search and retrieval", Real-Time Imaging, Academic Press Limited, GB, vol. 9, No. 1, Feb. 2003, pp. 73-98, XP004413477, ISSN: 1077-2014.

(Continued)

Primary Examiner—Seyed Azarian
(74) Attorney, Agent, or Firm—John P. O'Banion

(57) ABSTRACT

An apparatus and method of detecting scene changes within a video frame sequence. A video data frame pixel array is partitioned into pixel groups within a frame difference engine. Video data matching of each pixel group is compared between a preceding and following video frame. By way of example pixel group matching can be determined in response to comparing the sums of absolute pixel luminance and/or chrominance differences between corresponding pixels in corresponding pixel groups within the sequential frames against a threshold value. If an insufficient number of pixel groups match, then a scene change signal is output, such as to the encoder which decides whether to encode the entire frame or changes from prior frames. A media communication system is also described, preferably implemented within an SoC, which wirelessly communicates encoded video data for substantially simultaneous viewing by a receiver.

44 Claims, 3 Drawing Sheets

U.S. PATENT DOCUMENTS

| | | | |
|---|---|---|---|
| 6,157,747 A * | 12/2000 | Szeliski et al. | 382/284 |
| 6,272,250 B1 | 8/2001 | Sun et al. | |
| 6,473,465 B1 * | 10/2002 | Takahashi | 375/240.28 |
| 6,480,615 B1 | 11/2002 | Sun et al. | |
| 6,493,041 B1 * | 12/2002 | Hanko et al. | 348/699 |
| 6,625,214 B1 * | 9/2003 | Umehara et al. | 375/240.12 |
| 7,095,787 B2 * | 8/2006 | Kadono et al. | 375/240.27 |
| 7,110,455 B2 * | 9/2006 | Wu et al. | 375/240.16 |
| 2002/0044607 A1 | 4/2002 | Koga et al. | |
| 2003/0063806 A1 | 4/2003 | Kim et al. | |
| 2003/0142750 A1 | 7/2003 | Oguz et al. | |
| 2003/0169906 A1 | 9/2003 | Gokturk et al. | |
| 2003/0202712 A1 | 10/2003 | Porter et al. | |

FOREIGN PATENT DOCUMENTS

| | | |
|---|---|---|
| JP | 2002-185817 | 6/2002 |

OTHER PUBLICATIONS

Koprinska, I. et al., "Temporal video segmentation: A Survey", Signal Processing: Image Communication, Elsevier Science Publishers, Amsterdam, NL, vol. 16, No. 5, Jan. 2001, pp. 477-500, XP004224651, ISSN:0923-5965.

* cited by examiner

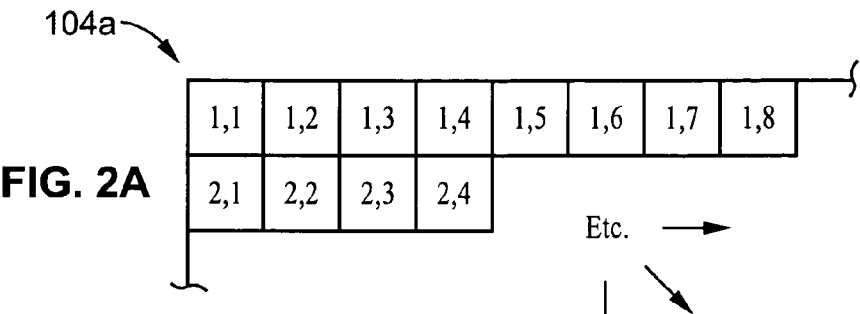
FIG. 2A
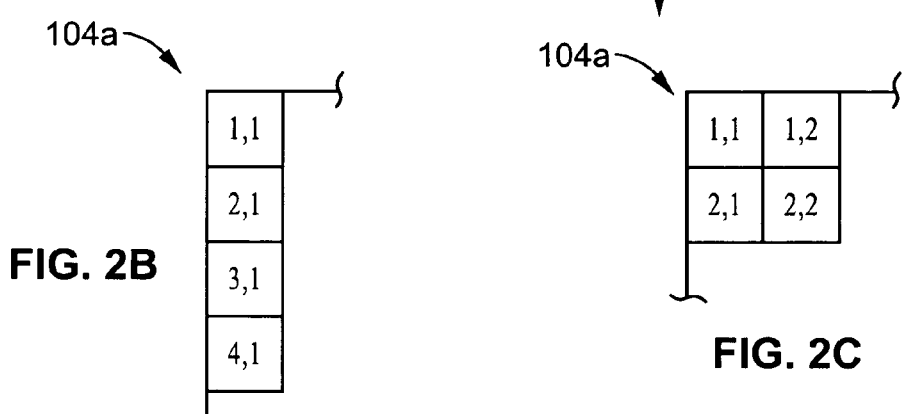
FIG. 2B
FIG. 2C
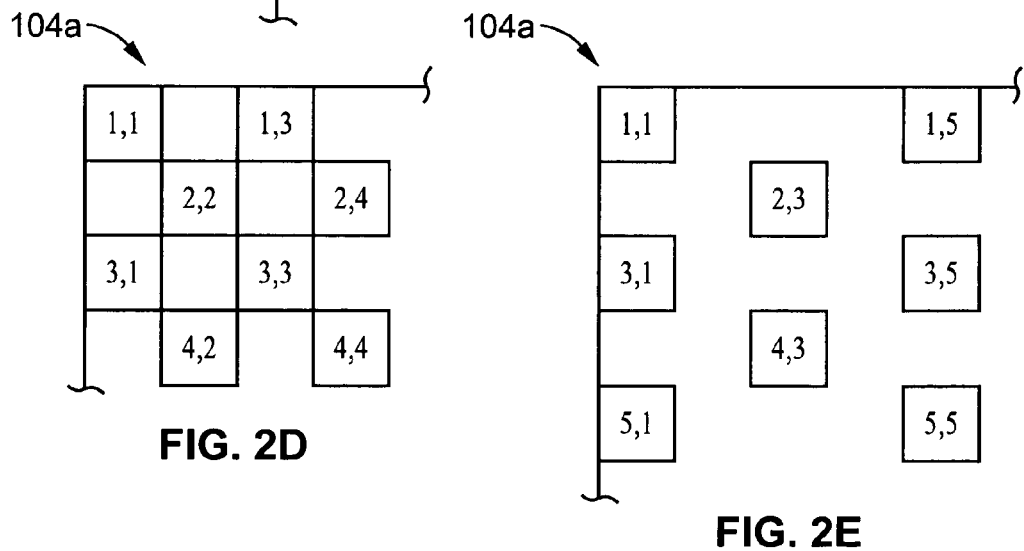
FIG. 2D
FIG. 2E
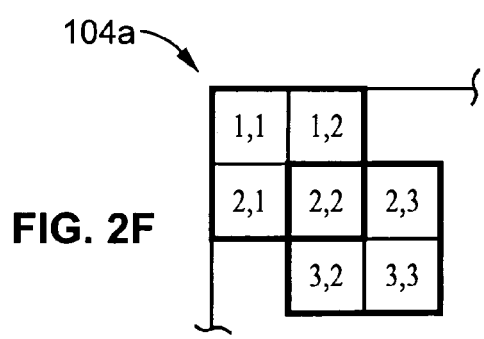
FIG. 2F

VIDEO CONTENT SCENE CHANGE DETERMINATION

CROSS-REFERENCE TO RELATED APPLICATIONS

This application claims priority to U.S. provisional application Ser. No. 60/490,288 filed on Jul. 25, 2003 which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF INVENTION

1. Field of Invention

The invention pertains to video processing, and more specifically to determining scene changes between video frames.

2. Description of Related Art

Motion picture video content data is generally captured, stored, transmitted, processed, and output as a series of still image frames. Small frame-by-frame data content changes are perceived as motion when the output is directed to a viewer at sufficiently close time intervals. A large data content change between two adjacent frames is perceived as a scene change (e.g., a change from an indoor to an outdoor scene, a change in camera angle, an abrupt change in illumination within the image, and so forth).

Encoding and compression schemes take advantage of small frame-by-frame video content data changes to reduce the amount of data needed to store, transmit, and process video data content. The amount of data required to describe the changes is less than the amount of data required to describe the original still image. Under standards developed by the Moving Pictures Experts Group (MPEG), for example, a group of frames begins with an intra-coded frame (I-frame) in which encoded video content data corresponds to visual attributes (e.g., luminance, chrominance) of the original still image. Subsequent frames in the group of frames (predictive coded frames (P-frames); bi-directional coded frames (B-frames)) are encoded based on changes from earlier frames in the group. New groups of frames, and thus new I-frames, are begun at regular time intervals to prevent, for instance, noise from inducing false video content data changes. New groups of frames, and thus new I-frames, are also begun at scene changes when the video content data changes are large because fewer data are required to describe a new still image than to describe the large changes between the adjacent still images. Therefore, during video content data encoding, it is important to identify scene changes between adjacent video content data frames.

Several schemes exist to identify scene changes between two video content data frames. Motion-based schemes compare vector motion for blocks of picture elements (pixels) between two frames to identify scene changes. Histogram-based schemes map, for instance, the distribution of pixel luminance data for the two frames and compare the distributions to identify scene changes. Discrete cosine transform- (DCT-)based schemes map pixel data to a frequency domain distribution for the two frames and compare the distributions to identify scene changes. Motion-, histogram-, and DCT-based schemes require a relatively high data processing power (typically measured in millions of instructions per second (MIPS)) since a large average number of instructions per pixel is required to carry out these schemes.

Another scheme to identify scene changes is to determine a pixel-by-pixel video content data difference between two frames. For one frame (n) composed of pixels P(n) and another frame (n+1) composed of pixels P(n+1), the aggregate difference is given by:

$$\Sigma(|P(n)-P(n+1)|)$$

which is compared to a threshold value. Aggregate differences more than the threshold value are considered scene changes. An advantage of this frame difference scheme is that a relatively low number of data processing instructions per pixel is required (e.g., an average of 3-4 instructions per pixel), and therefore the frame difference scheme requires relatively fewer MIPS than the motion-, histogram-, and DCT-based schemes described above.

The low MIPS requirement of this approach allows a data processor running at a moderate clocking rate, for example, 40 MHz, to perform real-time video content data encoding. However, a significant disadvantage of the frame difference scheme is that large changes in only a small portion of the first frame are falsely identified as scene changes. In practice, this frame difference scheme yields a large number of false scene change indications, wherein the efficiency of video content data compression suffers.

Therefore, a need exists for a video content data encoding scheme that accurately identifies scene changes so as to maximize video content data compression, while requiring only a small per-pixel instruction overhead. The present invention fulfills those needs and others, while overcoming the inherent drawbacks of previous approaches.

BRIEF SUMMARY OF INVENTION

The present invention generally comprises a method and system for readily detecting scene changes in a video frame sequence. By way of example, and not of limitation, the invention includes a frame difference engine that utilizes the scene change detection mechanism, as well as a media system which encodes and communicates video data in real time for receipt by a receiver-decoder. The method for detecting scene changes has a low MIPS requirement, which for example allows real-time encoding to be performed by system on chip (SoC) technology. The high compression of the resultant video signals allows, for example, the encoded video content data to be transmitted via wireless signals operating on limited bandwidth channels.

In one embodiment, the scene change detection mechanism is based on partitioning a video content data frame pixel array into pixel groups. Various pixel group topologies are described for various embodiments. Video content data associated with each pixel group is compared between sequential (i.e., a preceding and a following) video content data frames to determine the number of matching pixel groups between the two frames.

In one mode, the matching of pixel groups is predicated in some instances, by evaluating the aggregate pixel differences between corresponding pixel groups of sequential frames. A pixel group match is declared if the absolute value of the aggregate data difference is less than a preselected match threshold. By way of example, the aggregate pixel difference can be computed by summing absolute differences between corresponding pixels within corresponding pixel groups of the sequential frames.

If the number of matching pixel groups between the two frames is below a preselected scene change threshold value, then the following frame is encoded as a scene change with reference to the preceding frame.

In one illustrative embodiment, an apparatus for detecting a scene change in accordance with the present invention is implemented on a single integrated circuit chip along with other video processing circuits. A frame difference engine performs the scene change analysis and outputs scene change trigger information to an encoder. The encoder encodes a following video content data frame as a scene change if the encoder receives a scene change trigger from the frame difference engine.

Video content encoding within the integrated circuit embodiment preferably occurs in real time, and the accuracy of the scene change determination enables an encoded video content data stream to be embodied in a wireless data channel of limited bandwidth. In one mode, a television set acts as a receiver-transmitter that outputs received video content to a viewer, and also encodes and transmits the received video content to a portable receiver for video content output that is essentially simultaneous with the video content output by the receiver-transmitter.

In one embodiment, an apparatus for detecting scene changes between frames of a video sequence comprises means for partitioning the array of pixels within sequential video frames into pixel groups, means for detecting pixel groups which match the corresponding pixel group in a sequential frame based on evaluating aggregate pixel differences, and means for generating a scene change signal in response to detecting an insufficient number of matching pixel groups in the frame.

Various embodiments of the foregoing means can be implemented within a video frame processing element and associated programming configured for comparing sequential video frames. In some embodiments the video processing is performed in real time. Content comparison within this embodiment is based on luminance and/or chrominance data for each pixel of the pixel group. By way of example, the aggregate pixel differences can be determined by summing absolute pixel differences and comparing this to a threshold to determine if the corresponding pixel groups match. Any form of pixel grouping topology may be selected, insofar as the same topology is used for all sequential frames being compared. Embodiments of the scene change detection apparatus can be incorporated within an integrated circuit.

In another embodiment, a scene change detection apparatus according to the present invention comprises a processor configured for preparing received video data content for transmission, a frame difference engine configured for generating a scene change signal, an encoder configured to receive video data from the processor and to encode sequential frames in response to the scene change signal, and a transmitter configured to transmit the encoded video data to a remote receiver.

The transmitter (i.e., within a transceiver) is configured for wirelessly transmitting encoded video content to a remote receiver, in some cases with the communication performed in real time.

In still another embodiment, a method of detecting scene changes within a video sequence according to the invention comprises (a) defining a plurality of pixel groups, each comprising a plurality of pixels, within pixel arrays of a first and second video frame; (b) detecting pixel groups in the first frame which match the corresponding pixel group in the second frame in response to an evaluation of aggregate pixel differences between corresponding pixels within the corresponding pixel groups; and (c) generating a scene change trigger in response to detecting an insufficient number of matching pixel groups between the first frame and the second frame.

Accordingly, an aspect of the invention is the detection of scene changes between images in a video sequence.

Another aspect of the invention is providing the detection of scene changes that can be performed with low processing overhead.

Another aspect of the invention is detecting scene changes by detecting the number of matching pixel groups between sequential frames in relation to a threshold.

Another aspect of the invention is to provide a method of detecting scene changes which can be embodied within an integrated circuit.

Another aspect of the invention is to provide a method of detecting scene changes which can be embodied within a system-on-chip (SoC) implementation incorporating an electronic data processor.

Another aspect of the invention is to provide scene change detection which can be economically performed in real time.

Another aspect of the invention is to provide a scene change output trigger from a frame difference engine in response to detecting aggregate differences between pixels within pixel groups in successive frames.

Another aspect of the invention is to provide a scene change detection method which relies upon registering differences between overlapping and/or non-overlapping groups of pixels.

A still further aspect of the invention is to provide a scene change detection method which is based on detecting differences in luminance and/or chrominance between pixel groups in sequential scenes.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 2A-2F are diagrammatic views of pixel group topologies used in aspects of the present invention.

DETAILED DESCRIPTION

Referring more specifically to the drawings, for illustrative purposes the present invention is embodied in the apparatus and methods generally shown in FIG. 1 through FIG. 4. It will be appreciated that the apparatus may vary as to configuration and as to details of the parts, and that the method may vary as to the specific steps and sequence, without departing from the basic concepts as disclosed herein.

Numerous well-known elements (e.g., memory, data busses, interfaces) have been omitted from the accompanying drawings so as to more clearly show embodiments of the invention. Like-numbered elements shown in the various drawings represent like elements.

Figure 1:
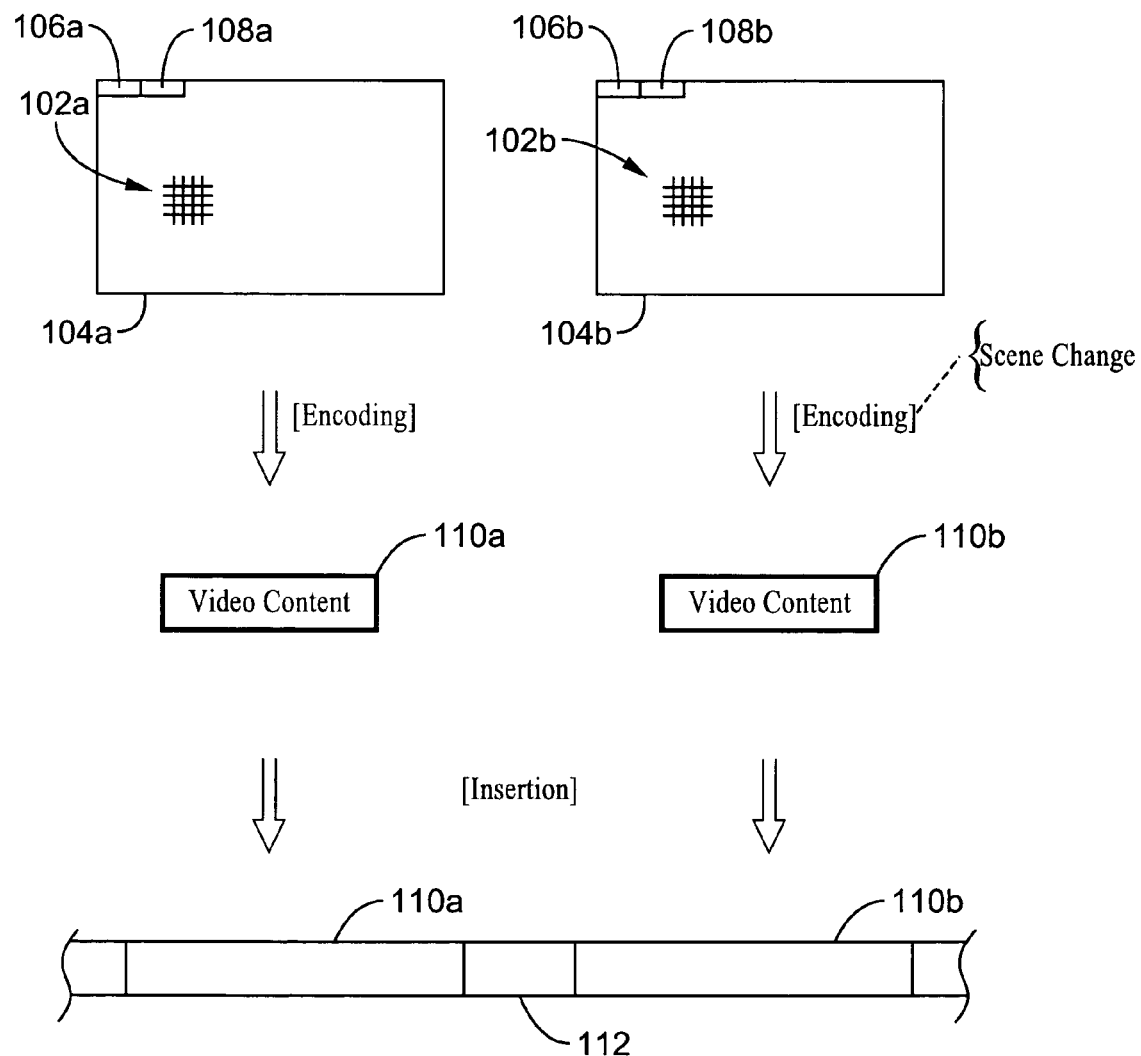
FIG. 1 is a diagrammatic view that illustrates still image frame video content encoding according to an aspect of the present invention.

FIG. 1 is a diagrammatic view that illustrates still image frame video content data encoding. As shown in the figure, a first still image is represented as numerous pixels 102a arranged in an array to make first still image video content data frame 104a. Data associated with each unique pixel 102a in image frame 104a represents, for example, a luminance or chrominance value of the corresponding small portion of the represented still image. Likewise, a second still image is represented as pixels 102b to make second still image video content data frame 104b. During output, the video content image represented by frame 104b immediately follows the video content image represented by frame 104a, thereby giving a viewer a perception of motion.

Frames 104a and 104b are partitioned into groups of two or more pixels per group. In one instance, for example, video content data frame 104a is partitioned into numerous groups of one-dimensional, horizontally-aligned pixels. The pixel groups include all pixels in the frame (omitted from the figure for clarity) and are illustrated by pixel groups 106a and 108a. The pixels in video content data frame 104b are likewise grouped and are illustrated by pixel groups 106b and 108b. Each unique pixel in each unique pixel group of frame 104a corresponds to a counterpart unique pixel in a counterpart unique pixel group of frame 104b. That is, each unique pixel and each unique pixel group occupy the identical array position in frames 104a, 104b.

FIGS. 2A-2F are diagrammatic views that illustrate pixel group topologies used in various embodiments. The pixel groups are shown at, for example, the upper left corner of frame 104a. Numbers associated with each pixel indicate the pixel's horizontal and vertical array position. FIG. 2A illustrates groups of one-dimensional, horizontally-aligned pixels, shown as pixel groups {(1,1), (1,2), (1,3), (1,4)}, {(1,5), (1,6), (1,7), (1,8)}, and {(2,1), (2,2), (2,3), (2,4)}. FIG. 2B illustrates a group of one-dimensional, vertically-aligned pixels, shown as pixel group {(1,1), (2,1), (3,1), (4,1)}. FIG. 2C illustrates a group of two-dimensional, contiguous pixels, shown as pixel group {(1,1), (1,2), (2,1), (2,2)}. FIG. 2D illustrates a group of two-dimensional, non-contiguous pixels in which pixels touch only at corners, shown as pixel group {(1,1), (1,3), (2,2), (2,4), (3,1), (3,3), (4,2), (4,4)}. FIG. 2E illustrates another group of two-dimensional, non-contiguous pixels {(1,1), (1,5), (2,3), (3,1), (3,5), (4,3), (5,1), (5,5)} in which pixels in the group do not touch at corners. Various one- and two-dimensional, contiguous and non-contiguous, and number of pixel topologies have been described by way of example, for instance, one-dimensional, horizontally aligned, contiguous groups of eight (8) pixels are used in one embodiment. It should be appreciated, therefore, that the pixel group topologies which can be utilized according the present invention are not limited to those shown in FIGS. 2A-2E.

In some embodiments the pixel groups are contiguous and blanket the entire video content data frame. In other embodiments, the pixel groups are non-contiguous and/or do not blanket the entire video content data frame. In still other embodiments, the pixel groups overlap as illustrated by FIG. 2F which shows, for example, that one group of pixels {(1,1), (1,2), (2,1), (2,2)} is overlapped by another group of pixels {(2,2), (2,3), (3,2), (3,3)}. Various overlapping of one- and two-dimensional pixel groups are used in various embodiments. Overlapping pixel groups increase scene change detection accuracy.

Referring again to FIG. 1, a frame difference engine first determines the number of pixel groups that match between video content data frames 104a and 104b, and then determines if the number of matching pixel groups exceeds a threshold value. For instance, the difference engine determines if pixel groups 106a and 106b match by comparing, for example, luminance data (and/or chrominance data) associated with each pixel in pixel group 106b against the luminance data (and/or chrominance data) associated with the pixel having the identical array position in pixel group 106a.

In one embodiment the comparison is performed based on the aggregate pixel differences between corresponding pixels within corresponding pixel groups in the sequential video content data frames. The aggregate pixel difference can, for example, be determined by summing the absolute difference value between corresponding pixels within corresponding pixel groups in the sequential video frames. The aggregate difference can be compared against a threshold to establish whether a pixel group matches in successive frames.

Accordingly, the difference engine determines if pixel groups 108a and 108b match, and so on, until all defined pixel groups are compared. It will be appreciated that a match signal or a mismatch signal can be generated in response to whether the match threshold criterion is met.

In one illustrative embodiment, for one pixel group (i) composed of pixels P(n) and another pixel group (i+1) composed of corresponding pixels P(n), the aggregate luminance (and/or chrominance) data difference is compared to a first threshold value, also referred to herein as a match threshold:

$$\Sigma(|P_i(n) - P_{i+1}(n)|) < Th_1$$

If the aggregate difference exceeds this first threshold value, the pixel groups are considered a match. There does not need to be an exact data match between two pixel groups for the groups to be declared as matching. Nevertheless, the first threshold value is set fairly low to ensure that pixels in the two pixel groups are sufficiently similar. By way of example the first threshold can be preferably set to a value in the range from approximately two (2) to eight (8) times the number of pixels within the pixel group. More preferably, the first threshold can be set to a value of four times the number of pixels within the pixel group. Chrominance data, or various combinations of luminance, chrominance, or other data can be utilized for performing the pixel comparisons within other embodiments without departing from the teachings of the present invention.

Next, the frame difference engine compares the number of matching pixel groups against a second threshold value, also referred to herein as a scene change threshold, to determine if a scene change has occurred:

No. matching pixel groups<$Th_2$

If the number of matching pixel groups is less than the second threshold value, the frame difference engine triggers a scene change instruction. The second threshold value is set fairly low, such as preferably between about one-sixteenth (1/16) to one-eight (1/8) of the total number of pixel groups. If the frame difference engine triggers a scene change instruction, frame 104b is encoded using data from the underlying still image rather than as data associated with changes from one or more preceding frames. It should be appreciated by those of ordinary skill in the art that similar results can be obtained by adjusting relative value operators and yes/no decision criteria performed by the frame difference engine.

In certain applications, such as with interlaced video or video operating in field mode, the possibility exists that a scene change can arise in one of the fields of the frame. In the common interlaced video format the change can arise between the top and bottom fields of the same frame. Therefore, according to one embodiment of the invention multiple scene change decisions are made on a per field basis, for example, making two separate scene change decisions based on changes arising in a top field (e.g., f_top(n) and f_top(n+1)) and a bottom field (e.g., f_bot(n) and f_bot(n+1)). Numerous related embodiments and variations should be obvious to one of ordinary skill in the art without departing from the teachings herein.

The encoding according to the invention can be performed in real time. If the difference engine declares a scene change between a first and second frame, then the encoded video image data of the second frame is based on data from the underlying still image. If the difference engine does not declare a scene change, then encoded video image data of the second frame is based on changes arising between the first and second video content data frame. In either case, the encoded video content can be inserted into an encoded video content data stream for transmission, reception, decoding and viewing.

Figure 3:
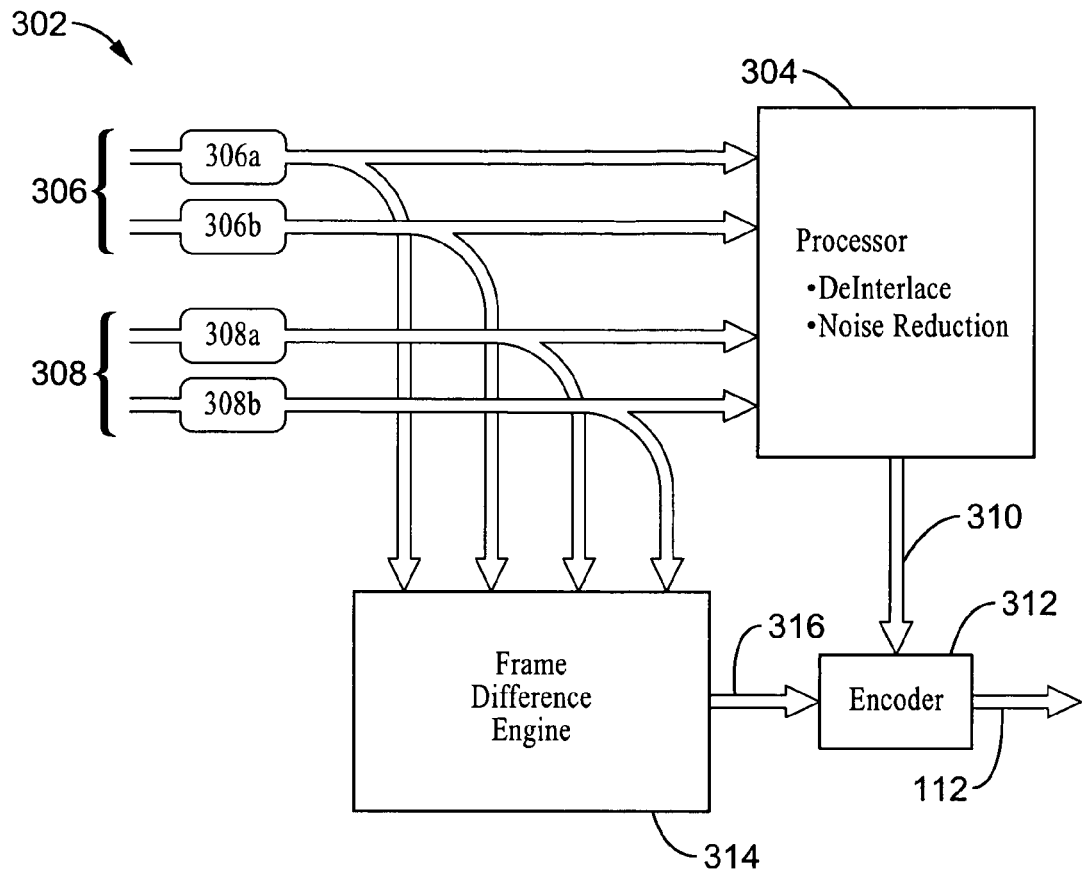
FIG. 3 is a flow diagram showing video content flow on a system-on-chip embodiment of the present invention.

FIG. 3 is a flow diagram showing video content information flow on, for example, a system-on-chip (SoC) embodiment 302. Electronic data processor 304 receives video content data as, for instance, first video content data frame information 306 and second video content data frame information 308. As shown in FIG. 3, first video content data frame information 306 includes top field information 306a and bottom field information 306b. Likewise, second video content data frame information 308 includes top field information 308a and bottom field information 308b. Top and bottom field information is used for some interlaced video applications. Processor 304 receives video content data frame information 306, 308, performs, for example, de-interlacing and noise reduction on the received information, and then sends the processed video content data 310 to encoder 312. Encoder 312 encodes the received processed video content data 310 in accordance with, for example, an MPEG frame encoding scheme, and outputs encoded video content data stream 112.

Frame difference engine 314 also receives video content data frame information 306, 308 and performs a group-by-group pixel comparison to determine if a scene change has occurred, as described above. Frame difference engine 314 outputs scene change trigger 316 to encoder 312 if a scene change has occurred. Encoder 312 encodes the processed video content data associated with second video content frame data 308 as a scene change if encoder 312 receives a scene change trigger.

Figure 4:
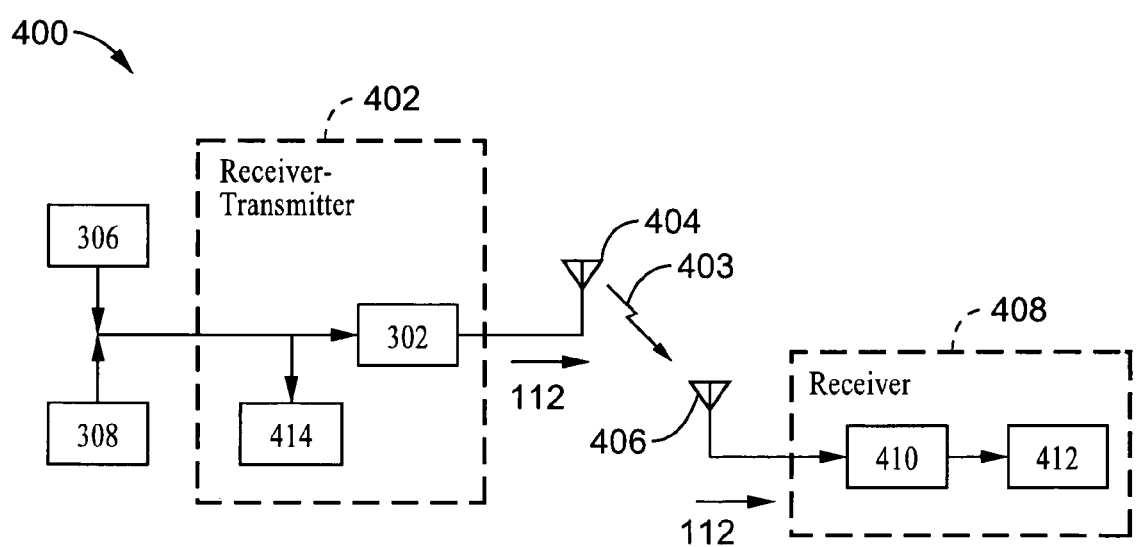
FIG. 4 is a diagrammatic view of an electronic stationary media receiver-transmitter and portable media receiver system according to an aspect of the present invention.

FIG. 4 is a diagrammatic view of an electronic stationary media receiver-transmitter and portable media receiver system embodiment 400 (e.g., WEGA®-ALTAIR® Media Receiver and Media Palette combination). Receiver-transmitter 402 includes system-on-chip 302, which receives video content data 306, 308 as described above, for example embodied in a television signal. Receiver-transmitter 402 also includes (either as part of SoC 302 or separately) a transmitter (not shown) and antenna 404 electrically coupled to the transmitter. The transmitter transmits video content data stream 112 embodied in a wireless signal 403 (e.g., radio-frequency, infra-red, and so forth) via antenna 404 to antenna 406 on receiver 408. Receiver 408 includes decoder 410 that decodes encoded video content data 112, and the decoded video content is subsequently output via conventional video display 412. The video content output via display 412 is thus output in essentially real time with the video content output via conventional video display 414 in receiver-transmitter 412. Thus video content is encoded in real time using a limited-MIPS SoC processor, is encoded with sufficient compression to be transmitted via a limited bandwidth wireless data channel, and is output in real time.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for detecting scene changes in a video sequence, comprising:
    means for partitioning the array of pixels within sequential video frames into a plurality of pixel groups which are one-dimensional, two-dimensional, contiguous, non-contiguous, overlapping or non-overlapping;
    means for detecting pixel groups which match the corresponding pixel group, at an identical position, in a sequential frame based on evaluating aggregate pixel differences;
    means for determining number of matching pixel groups in said sequential video frames; and
    means for generating a scene change signal in response to detecting an insufficient number of matching pixel groups in the frame and without need of determining pixel-by-pixel content differences between pixels of said sequential video frames.

2. An apparatus as recited in claim 1, wherein said aggregate pixel differences are determined in response to the sum of the absolute value of individual pixel differences between corresponding pixels in corresponding pixel groups within said sequential video frames.

3. An apparatus as recited in claim 1, wherein said individual pixel differences are determined based on luminance and/or chrominance data for said individual pixel.

4. An apparatus as recited in claim 1, wherein said means for partitioning, detecting, and generating are performed in response to programming executable on a computer processing element.

5. An apparatus for detecting scene changes between frames of a video sequence, comprising:
 a video frame processing element configured for comparing sequential video frames; and
 programming executable on said processing element for
  (i) partitioning the pixel arrays of sequential video frames into pixel groups,
  (ii) summing absolute differences between pixels within a given said pixel group and corresponding pixels within corresponding pixel groups, at an identical position, in an adjacent frame of said sequential video frames,
  (iii) detecting pixel groups within a frame which match the corresponding pixel group in said adjacent frame in response to comparing sum of absolute pixel differences against a match threshold,
  (iv) determining how many pixel groups match, to arrive at a number of matching pixel groups; and
  (v) generating a scene change output signal in response to comparing the number of matching pixel groups against a scene change threshold and without need of determining pixel-by-pixel content differences between pixels of adjacent frames.

6. An apparatus as recited in claim 5, wherein said programming is performed in real time.

7. An apparatus as recited in claim 5, wherein said differences between pixels is determined based on luminance data.

8. An apparatus as recited in claim 5, wherein said differences between pixels is determined based on a combination of luminance and chrominance data.

9. An apparatus as recited in claim 5, wherein each of said pixel groups comprise at least two pixels having a predetermined positional relationship within the sequential video frames.

10. An apparatus as recited in claim 5,
 wherein each of said pixel groups comprise at least two pixels having a predetermined positional relationship within the video frame;
 wherein said programming further comprises selecting a pixel grouping topology that establishes the predetermined positional relationships of the pixels within each said pixel group.

11. An apparatus as recited in claim 5, wherein said pixel groups of a frame are one-dimensional, two-dimensional, contiguous, or non-contiguous.

12. An apparatus as recited in claim 5, wherein said pixel groups of a frame can be overlapping or non-overlapping.

13. An apparatus as recited in claim 5, wherein each given pixel group within a first video frame corresponds to a counterpart pixel group comprising the same group of pixels, at an identical position, within a second video frame.

14. An apparatus as recited in claim 5, wherein said match threshold comprises the product of a predetermined constant multiplied by the number of pixels within said pixel group.

15. An apparatus as recited in claim 5:
 wherein said match threshold comprises the product of a predetermined constant multiplied by the number of pixels within said pixel group; and
 wherein said match threshold comprises between approximately two to eight times the number of pixels within said pixel group.

16. An apparatus as recited in claim 5:
 wherein said match threshold comprises the product of a predetermined constant multiplied by the number of pixels within said pixel group; and
 wherein said match threshold comprises approximately four times the number of pixels within said pixel group.

17. An apparatus as recited in claim 5, wherein said scene change threshold comprises a predetermined fraction of the number of said pixel groups within said frames of a video sequence.

18. An apparatus as recited in claim 5:
 wherein said scene change threshold comprises a predetermined fraction of the number of said pixel groups within said frames of a video sequence; and
 wherein said scene change threshold comprises between approximately one-sixteenth to one-eighth the number of pixel groups in said frames of a video sequence.

19. An apparatus as recited in claim 5, wherein said video frame processing element is embedded within an integrated circuit.

20. An apparatus as recited in claim 5:
 wherein said video frame processing element is embedded within an integrated circuit; and
 wherein said integrated circuit comprises a system-on-chip integrated circuit.

21. An apparatus as recited in claim 5, wherein said apparatus for detecting scene changes is incorporated within a frame difference engine.

22. An apparatus as recited in claim 5;
 wherein said apparatus for detecting scene changes is incorporated within a frame difference engine; and
 wherein said frame difference engine is configured for sending said scene change output signal to a video encoder.

23. An apparatus as recited in claim 5:
 wherein said apparatus for detecting scene changes is incorporated within a frame difference engine;
 wherein said frame difference engine is configured for sending said scene change output signal to a video encoder; and
 wherein said frame difference engine is incorporated within a receiver-transmitter having an encoder for encoding video content and transmitting it to a remote receiver.

24. A system for communicating media, comprising:
 a processor configured for preparing received video data content for transmission;
 a frame difference engine configured for generating a scene change signal in response to,
  (i) evaluating aggregate pixel differences between corresponding pixels within corresponding pixel groups, at an identical position, and determining which pixel groups match pixels groups at corresponding locations between adjacent frames,
  (ii) determining matching pixel blocks to arrive at a number of matching pixel blocks;

(iii) detecting that said number of matching pixel groups in the frames being compared is insufficient, without the need of determining pixel-by-pixel content differences between the pixels of two adjacent frames;

an encoder configured to receive video data from said processor and to encode sequential frames in response to said scene change signal; and a transmitter configured to transmit said encoded video data to a remote receiver.

25. A system as recited in claim 24, wherein said transmitter is configured for wirelessly transmitting encoded video content to a remote receiver.

26. A system as recited in claim 24:

wherein said transmitter is configured for wirelessly transmitting encoded video content to a remote receiver; and wherein said wireless transmission is performed in real time.

27. A system as recited in claim 24, wherein said transmitter comprises a transceiver capable of both transmitting and receiving.

28. A system as recited in claim 24, wherein said media communication system is incorporated within an integrated circuit.

29. A system as recited in claim 24, further comprising a means for displaying video received by said processor.

30. A system as recited in claim 24, wherein said preparing of received video data content comprises de-interlacing, noise reduction processing, or a combination of de-interlacing and noise reduction processing.

31. A system as recited in claim 24, wherein said encoder is configured to encode the video being output as changes which arise between video frames, unless the scene change signal is received wherein the encoder then encodes the entire video frame for output.

32. A system as recited in claim 24:

wherein said individual pixel differences are determined based on luminance and/or chrominance data for said individual pixel.

33. A system as recited in claim 24, wherein said frame difference engine comprises:

a video frame processing element configured for comparing sequential video frames; and programming executable on said processing element for (i) partitioning the pixel arrays of sequential frames into corresponding pixel groups, (ii) summing the absolute differences between pixels within a given said pixel group and the corresponding pixels within the corresponding pixel group of said sequential video frame to arrive at an aggregate difference value for said pixel group, (iii) detecting pixel groups within a frame which match the corresponding pixel group in said sequential video frame in response to comparing the sum of the absolute pixel differences against a match threshold, and (iv) generating a scene change output signal in response to comparing the number of matching pixel groups against a scene change threshold.

34. A system as recited in claim 24, further comprising:

a receiver configured for receiving the video content data stream from said transmitter which can be output to a video display.

35. A method of detecting scene changes within a video frame sequence, comprising:

defining a plurality of pixel groups, each comprising a plurality of pixels, within pixel arrays of a first and second video frame;

detecting pixel groups in said first frame which match the corresponding pixel group in said second frame in response to an evaluation of aggregate pixel differences between corresponding pixels within the corresponding pixel groups; and generating a scene change trigger in response to detecting an insufficient number of matching pixel groups between said first frame and said second frame;

wherein said method is executed as programming for a computer processor;

wherein said programming is executed within a frame difference engine;

wherein said frame difference engine generates said scene change trigger in response to the number of matching pixel groups being found less than a predetermined scene change threshold value; and wherein said predetermined threshold value comprises a fraction of the total number of pixel groups in the video frame.

36. A method as recited in claim 35, wherein said aggregate pixel differences are determined in response to summing the absolute value of pixel differences between corresponding pixels of corresponding pixel groups of said first and second frames.

37. A method as recited in claim 35, wherein said fraction comprises between approximately a sixteenth to an eighth of the total number of pixel groups in the video content data frame.

38. A method as recited in claim 35 wherein each video data frame comprises data associated with an array of pixels.

39. A method as recited in claim 35:

wherein each video data frame comprises data associated with an array of pixels;

wherein a plurality of said pixel groups are defined in said array of pixels; and wherein each defined pixel group within said pixel groups comprises a plurality of pixels.

40. A method as recited in claim 35, wherein said detecting of said match between said pixel group in said first data frame and the corresponding pixel group in said second data frame is based on the evaluation that the sum of individual pixel differences between corresponding pixels within the corresponding pixel groups meets a predetermined pixel match threshold value.

41. A method as recited in claim 35:

wherein said detecting of said match between said pixel group in said first data frame and the corresponding pixel group in said second data frame is based on the evaluation that the sum of individual pixel differences between corresponding pixels within the corresponding pixel groups meets a predetermined pixel match threshold value; and further comprising generating said predetermined pixel match threshold value prior to said detecting of pixel group matching.

42. An apparatus for encoding scene changes within an interlaced video content data stream, comprising:

a video frame processing element configured for receiving top and bottom field information of interlaced video for each of a first and second video data frame;

said video frame processing element configured for performing de-interlacing and noise reduction on said first and second video data frames, and outputting processed video content data;

a difference engine configured for receiving top and bottom field information for each of a first and second video data frame;

said difference engine configured for performing a group-by-group pixel comparison and determining if a scene change has occurred in response to detecting that the number of matching pixel groups between frames exceeds a predetermined threshold;

said different engine configured for outputting a scene change trigger in response to detecting a scene change; and an encoder configured for encoding said processed video content data from said video frame processing element responsive to said scene change trigger to output an encoded video content data stream.

43. An apparatus as recited in claim 42, wherein said apparatus is fabricated as a system-on-chip (SoC).

44. An apparatus as recited in claim 42, wherein said pixel groups have any desired topology and cover any desired portion of the frame in an overlapping or non-overlapping pattern.

\* \* \* \* \*

UNITED STATES PATENT AND TRADEMARK OFFICE
CERTIFICATE OF CORRECTION

PATENT NO.       : 7,606,391 B2                                      Page 1 of 1
APPLICATION NO.  : 10/864915
DATED            : October 20, 2009
INVENTOR(S)      : Gadre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1344 days.

Signed and Sealed this

Twelfth Day of October, 2010

David J. Kappos
*Director of the United States Patent and Trademark Office*